No. 734,072. PATENTED JULY 21, 1903.
P. B. LASKEY.
DENTAL CLAMP.
APPLICATION FILED APR. 18, 1903.
NO MODEL.
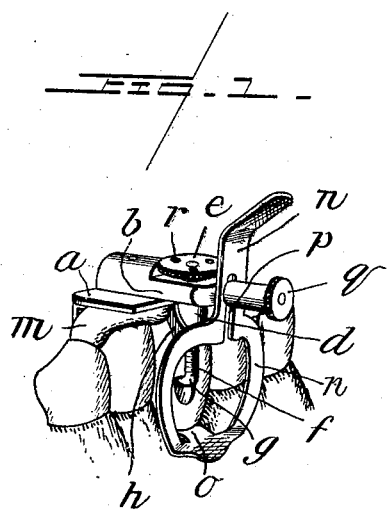
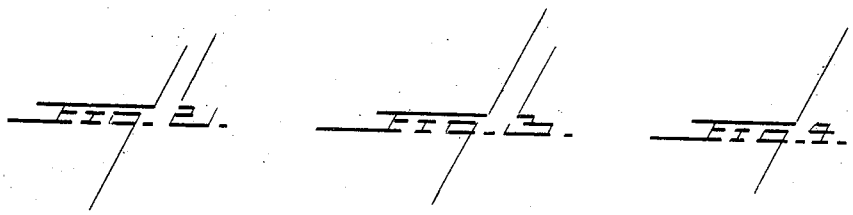
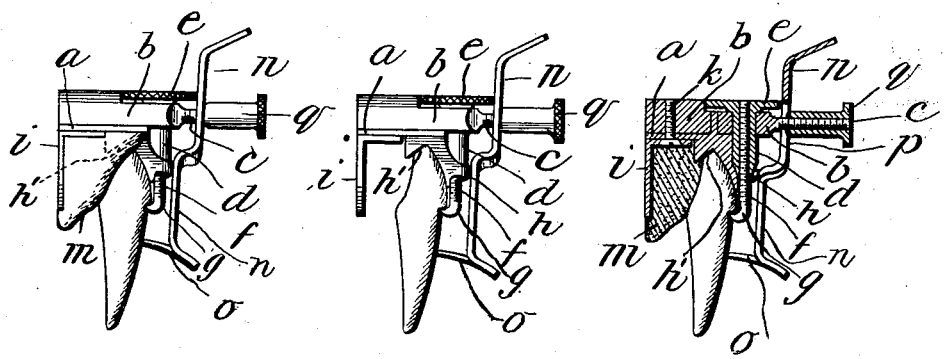
WITNESSES:
INVENTOR:
Philip B. Laskey,
BY
Attorney.

No. 734,072.

Patented July 21, 1903.

UNITED STATES PATENT OFFICE.

PHILIP B. LASKEY, OF MARBLEHEAD, MASSACHUSETTS.

DENTAL CLAMP.

SPECIFICATION forming part of Letters Patent No. 734,072, dated July 21, 1903.

Application filed April 18, 1903. Serial No. 153,164. (No model.)

*To all whom it may concern:*

Be it known that I, PHILIP B. LASKEY, a citizen of the United States, residing at Marblehead, in the county of Essex and State of Massachusetts, have invented certain new and useful Improvements in Dental Clamps, of which the following is a specification, reference being had therein to the accompanying drawings.

This invention relates to dental cervix-clamps used to hold rubber dams in place and to serve to push and hold back the gum from the necks of teeth to permit of convenient access to cavities which may occur in teeth close up to the gums; and the invention has for its object to provide a clamp of the class referred to which is of such construction as to permit approximate closing of the mouth of the patient, so as not unnecessarily to tire the patient during protracted operations, as also to provide a clamp which will have an anchorage entirely independent of the cervical clamp proper, so that the pressure of the cervical clamp does not depend on the pressure of the anchoring clip or clamp, thus avoiding excessive injurious pressure on the gum, which provides for a secure anchorage, while at the same time affording means for reliably securing the device in place.

In the accompanying drawings, Figure 1 is a perspective view of the improved clamp, illustrative of its use. Figs. 2 and 3 are side views of the same in connection with a tooth to which the device is shown as being attached, the plastic material shown in Fig. 2 being omitted from Fig. 3. Fig. 4 is a view similar to Fig. 2, but with the parts shown in section.

The body of the clamp comprises a plate $a$, formed rigid with or attached to a small block $b$, provided with a threaded pin $c$. Mounted in a portion of the block $b$, so as to turn readily therein, is an interiorly-screw-threaded sleeve or nut $d$, having a milled head $e$, said sleeve or nut engaging the threaded shank $f$ of the hook $g$, and said shank passing loosely through a hole in a portion of a block $h$, formed integral with or attached to the plate $a$. The block $h$ is provided with a V-shaped notch $h'$, adapted to embrace the upper tapering portion of a tooth, while the hook $g$ is adapted to engage the shoulder or wall of a cavity in the tooth in such a manner that by means of the inclined walls of said V-shaped notch and the said hook the anchoring portion of the clamp may be readily attached to a tooth in the manner shown in the drawings. The plate $a$ is, however, preferably provided with a plate or flange $i$, which may be rigid with the said plate $a$, but which will preferably be attached to said plate by means of a screw $k$ in such a manner as to have a swiveled connection therewith. The plate $i$ is adapted to fit against a mass of plastic material, such as $m$, which may be interposed between said plate $i$ and the teeth in the manner shown in the drawings, so as to coöperate with the screw-operated attaching-hook $g$ and the notched block $h$ in securing the clamp in place to the tooth. This plastic material may be the ordinary impression-gum used by dentists, and in using the same it will be somewhat softened by heat, but quickly becomes sufficiently stiff so that it will serve to steady the attaching clamp or clip, and as it will conform to the particular shape of the tooth or teeth against which it is forced it individualizes the anchorage and automatically provides a special clamp for each particular formation of tooth or teeth in connection with which it may be used.

The cervical clamp proper consists of a skeleton or open arm $n$, having at its outer portion an inturned lug or lugs $o$, fitted to bear against the neck of a tooth, and having a slot $p$ loosely straddling the threaded pin $c$, on which is fitted a nut $q$, adapted to bear against the shank of said arm $n$, and thus hold the clamp in place against the rubber dam, which in practice will be interposed between the gum and the lug or lugs of the said arm or clamp. The slot $p$ permits of the proper vertical adjustment of the clamping-arm to any position which may be desired and also permits of the ready removal of said arm when it may be desired to substitute a similar clamping-arm, but of slightly-different form, and an indefinite number of which similar forms may be interchangeably used to fit different teeth. When the clamp or clamping-arm $n$ is adjusted in place, the nut $q$ will be tightened, forcing said arm against the tooth and also against the milled head e of the sleeve d, thus serving to lock said head and avoiding any loosening of the hook g when the latter has been properly tightened in place. The said milled head e will preferably be provided with small holes r, permitting the insertion of a pointed instrument in turning said head, if desired.

Where the tooth is of proper shape, so that the notch in the block h will properly fit the top of a tooth, the plastic material or impression compound may be omitted, as the clamp may be properly anchored to the tooth by means of the hold afforded by the said block and the coöperating screw-operated hook g; but in the majority of instances it will be preferable to employ the stiff plastic material, as it will greatly assist the other holding parts in anchoring the clamp to a tooth, and in such case the depending plate or flange i becomes an important feature of the clamp in that it bears against the plastic material which will be employed to assist in anchoring the clamp to a tooth or teeth.

From the foregoing it will be apparent that the improved clamp can be properly anchored in place by means of the clip afforded by the notched block h and the coöperating screw-adjusted hook g, assisted when desired by the depending plate i and the plastic impression material or gum forced against a tooth by the same when the said screw-adjusted hook is tightened. This anchorage of the clamp can be tightened to any proper degree by turning the sleeve or nut d by means of its head e to tighten the screw-operated hook g, and said anchorage is entirely independent of the clamping effect secured by tightening the nut q against the cervical clamping-arm n.

While it may be preferable in the majority of cases to anchor the clamp to the teeth by means of the notched block h and the coöperating screw-operated hook g with or without the assistance of the plastic material held in the receptacle afforded by the depending plate or flange i, it will be apparent that the clamp is adapted to be anchored in place to the teeth by means of plastic material and the cervical clamping-plate n when said plastic material is rendered adhesive by heat in such a manner as to hold or anchor the clamp in place with sufficient security for a class of favorable cases, and especially so where the retraction of the gum by means of the cervical clamping-arm n, with its tooth or teeth o, is not excessive. In such cases the screw-operated hook g need not be used at all.

Having thus described my invention, I claim and desire to secure by Letters Patent—

1. A dental clamp comprising a body provided with a notched block fitted to embrace the tapering upper portion of a tooth, in combination with an adjustable hook by which, in coöperation with said notched block, the cervical clamp may be anchored to a tooth.

2. A dental cervical clamp comprising a body provided with a notched block fitted to embrace the tapering upper portion of a tooth, in combination with an adjustable hook by which, in coöperation with said notched block, the clamp may be anchored to a tooth, said body having connected therewith a plate or flange adapted to press against a mass of plastic material which will assist in anchoring the clamp in place.

3. A dental clamp comprising a body provided with a notched block fitted to embrace the tapering upper portion of a tooth in combination with an adjustable hook by which, in coöperation with said notched block, the clamp may be anchored to a tooth, a cervical clamp proper removably attached to said body, and a screw or nut, independent of the anchoring means, for holding said clamp proper in place.

4. A dental clamp consisting of a cervical clamping-arm and a body having an anchoring-clip by which the clamp may be attached to a tooth, said anchoring-clip comprising a plate or flange between which and a tooth a mass of plastic material may be interposed to assist the holding operation of the anchoring-clip.

5. A dental clamp consisting of a cervical clamping-arm and a body having an anchoring-clip by which the clamp may be attached to a tooth, said anchoring-clip comprising a plate or flange between which and a tooth a mass of plastic material may be interposed to assist the holding operation of the anchoring-clip, said plate or flange having a pivoted or swiveled connection with the body of the clamp.

6. A dental clamp consisting of a body having an anchoring-clip by which the clamp may be attached to a tooth, said anchoring-clip comprising a plate or flange between which and a tooth a mass of plastic material may be interposed to assist the holding operation of the anchoring-clip, combined with a cervical clamping-arm, and means, independent of the anchoring means, for securing said cervical clamping-arm in place.

7. A dental clamp consisting of a body having an anchoring-clip by which the clamp may be attached to a tooth, said anchoring-clip comprising a plate or flange between which and a tooth a mass of plastic material may be interposed to assist the holding operation of the anchoring-clip, said plate or flange having a pivoted or swiveled connection with the body of the clamp, combined with a cervical clamping-arm, and means, independent of the anchoring means, for securing said cervical clamping-arm in place.

8. The herein-described dental clamp comprising the plate a, the block b rigid therewith and provided with a screw-threaded pin c, the block h also rigid with said plate a and having a V-shaped notch h', the hook g connected with the body of the clamp and having a threaded shank, a sleeve or nut engaging said shank, the cervical clamping-arm $n$, and the nut $q$ engaging said threaded pin and serving to hold the said cervical clamping-arm in place.

9. The herein-described dental clamp comprising the plate $a$, the block $b$ rigid therewith and provided with a screw-threaded pin $c$, the block $h$ also rigid with said plate $a$ and having a V-shaped notch $h'$, the hook $g$ connected with the body of the clamp and having a threaded shank, a sleeve or nut engaging said shank, the cervical clamping-arm $n$ and the nut engaging said threaded pin and serving to hold the said cervical clamping-arm in place, the body of the clamp being provided with a flange or plate, as $i$, between which and the tooth a plastic mass of material may be interposed.

10. A dental clamp comprising a cervical clamping-arm and a body provided with means affording a receptacle for a mass of plastic material, said clamp being also provided with means, acting in opposition to the plastic material held in such receptacle, for securing the clamp in place with the coöperative assistance of such plastic material.

In testimony whereof I affix my signature in presence of two witnesses.

PHILIP B. LASKEY.

Witnesses:
WILLIAM A. BROWN,
HORACE L. BROUGHTON.